E. B. KILLEN.
WHEEL AND WHEEL FITMENT.
APPLICATION FILED FEB. 26, 1920.
1,379,577.
Patented May 24, 1921.
2 SHEETS—SHEET 1.
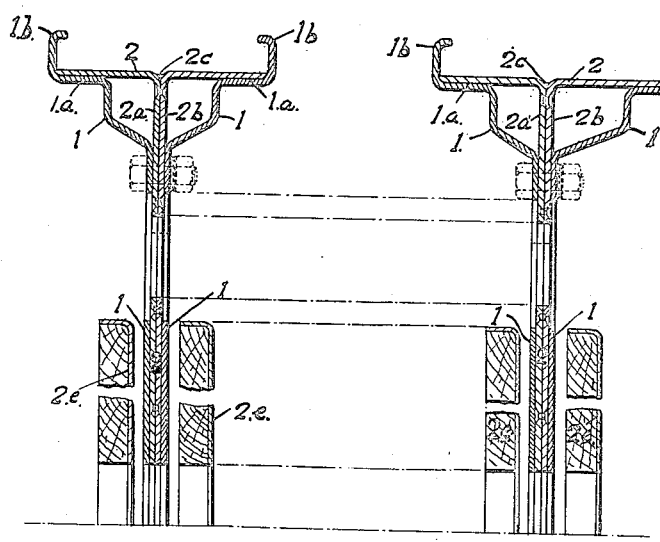
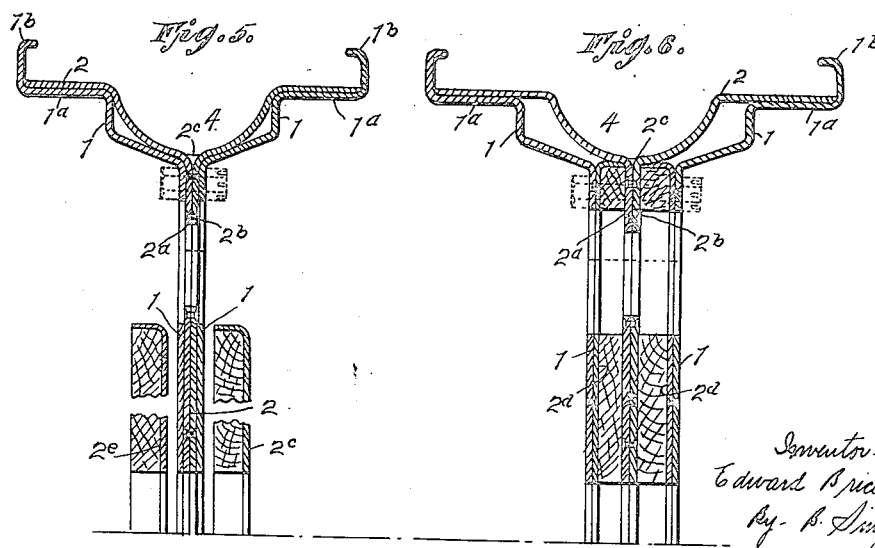

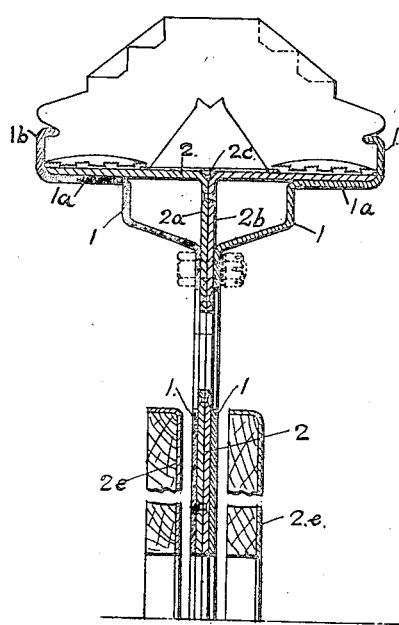
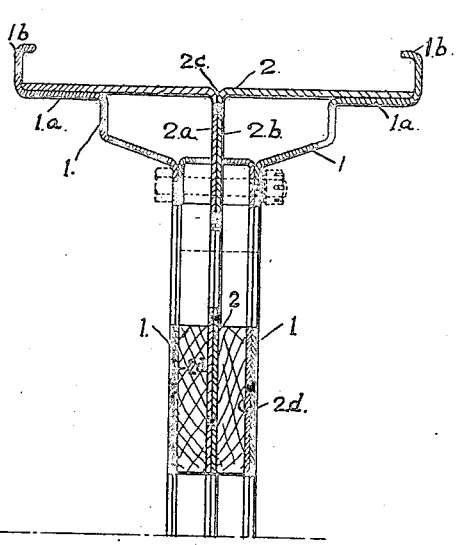

UNITED STATES PATENT OFFICE.

EDWARD BRICE KILLEN, OF LONDON, ENGLAND.

WHEEL AND WHEEL-FITMENT.

1,379,577.   Specification of Letters Patent.   Patented May 24, 1921.

Application filed February 26, 1920. Serial No. 361,531.

*To all whom it may concern:*

Be it known that I, EDWARD BRICE KILLEN, a subject of the King of Great Britain, of 27 Queen Victoria street, London, E. C. 4, England, engineer, have invented certain new and useful Improvements in or Relating to Wheels and Wheel-Fitments, of which the following is a specification.

My invention relates to wheels of a type somewhat similar to those described in the specification of my previous application Serial Number 297149 dated 14th May 1919.

In order that my invention may be properly understood and readily carried into effect, I have hereunto appended three sheets of drawings, of which—

Figure 1 is a cross section of a wheel made in accordance with my invention.

Fig. 2 is another cross section of a wheel made in accordance with my invention and providing a greater overhanging of the rim.

Fig. 3 is another cross section of a modified form of my invention showing a tire clamped in position over the wheel.

Fig. 4 is a cross section of a modified form of Fig. 3 in which the wheel is constructed wider by increasing the width of the circumferential distance piece 2 and using distance pieces $2^d$ Fig. 5 is another cross section of a modified form of my invention in which a cavity 4 is constructed in the wheels outer circumference.

Fig. 6 is a modified form of Fig. 5 in which the wheel is constructed wider by increasing the width of the circumferential distance piece 2 and using distance pieces $2^d$, all hereafter more fully referred to and described.

In my previous specification the main part of the wheel proper was constructed from two main dishlike stampings which formed the rim of the wheel and which I called the front and back dishlike stampings of the wheel. In this invention I also use a front and back dishlike stamping 1 which stampings may be constructed alike, see Figs. 3, 4, 5 and 6, but in this invention the two stampings 1 are capable of being adjusted closer up to or farther away from each other so as to form wheels of varying widths and be then rigidly connected together at the circumference and at the center to form the width of wheel required, by means of a suitable distance piece 2 which I will call the circumferential distance piece of the wheel and which may be constructed from two metal stampings $2^a$ and $2^b$ riveted together back to back. This distance piece 2 varies in shape and dimensions to suit the width of wheel required to be manufactured, and the hub to which the wheel is attached.

The outer rim of the wheel may be formed from the two stampings $2^a$ and $2^b$ constructed of suitable shape and dimensions and with a suitable truly circular rim part, the two stampings $2^a$ and $2^b$ being preferably riveted and brazed together back to back to form an airtight joint between the stampings at the wheel's circumference and in combination with the front and back dishlike metal stampings 1 form on the wheel's outer circumference a clamping device.

Each front and back dishlike metal stamping 1 is formed with a truly circular rim part $1^a$ and over the rim part $1^a$ of each front and back stamping 1 is snugly fitted the suitable distance piece 2 which connects the front and back dishlike stampings of the wheel rigidly together at the outer circumference of the wheel see Figs. 1, 2, 3 and 4.

The metal in each front and back dishlike stamping 1 after forming a supporting metal bed $1^a$ for the distance piece 2 (which is fitted under compression over the two supporting bed circumferences of the dishlike stampings) runs outward and preferably forms a hooking flange $1^b$ at the extreme overhanging edge of each front and back dishlike stamping 1, enabling a tire, or felly, or equivalent to be clamped, keyed and locked in position to the wheel's outer circumference after being fitted under compression to the endless metal distance piece 2, see Fig. 3.

The metal of the dishlike stampings 1 may be fitted and bolted back to back at the central part of the wheel close together or farther apart if required, to suit the width of wheel required to be built, by fitting the correct width of circumferential distance piece 2 and when required two suitable central distance pieces $2^d$ may be fitted between the front and back dishlike stampings 1 and the circumferential distance piece 2 as it runs toward the wheel's center, thereby enabling the front and back metal stampings 1 to be rigidly connected together at the wheel's outer circumference and at its center by means of suitable distance pieces in conjunction with bolts and nuts, and enabling a strong standard wide wheel to be constructed in varying widths to suit many types of chassis, see Figs. 2, 3, 4, 5 and 6, which wheels are capable of being easily fitted to practically any type of hub, by using additional suitable central distance pieces 2$^c$.

The central distance pieces 2$^d$ and 2$^e$ may be constructed from suitable metal plates or metal stampings having say wood keyed within them, and said distance pieces 2$^d$ and 2$^e$ may, when required, be suitably riveted to the central part of the front and back dishlike stampings 1, giving great strength to the wheel at its center and facilitating its attachment to practically any dimension of hub. The right and left dishlike stampings 1 being attached to and detached from the distance piece 2 by say using a hydraulic press or its equivalent when placing a tire on or removing the same from its wheel.

In this wheel suitable lightening holes are perforated in each standard front and back dishlike stamping 1 and also in the circumferential dishlike stampings 2$^a$ and 2$^b$ to give the wheel a light appearance and to facilitate its divisibility in any well-known manner. The front and back dishlike stampings 1 in each wheel may be clamped or fitted together in proper position back to back in any well known manner, and when in correct position bolts and nuts hold the front and back stampings 1 and the circumferential distance piece stamping 2$^a$ and 2$^b$ of the wheel in correct relative position to each other, with or without suitable central distance pieces 2$^d$ and 2$^e$ as required.

This combination enables suitable tires to be fitted under compression over the truly circular rim of the circumferential distance piece 2 under compression and be then clamped in position by means of the front and back dishlike stampings 1, see Fig. 3.

In the construction of these wheels radially arranged rivets are preferably not used between the wheel center and its rim and any bolts (or rivets) which may be used in these wheels are used horizontally to keep the dishlike metal stampings and plates in correct relative position to each other laterally and therefore the shocks due to the drive, braking and side thrusts are not taken by objectionable radially arranged rivets in shear because the main stampings 1, 2$^a$ and 2$^b$ run from the center of the wheel to its rim unbroken.

The standard wheel fitments may be constructed to build many varying dimensions and shapes of disk wheels which are capable of being adjusted laterally on practically any hub or hub fitment, to suit the existing varying types of chassis, besides having many other advantages.

Although I may use front and back dishlike stampings 1 stamped exactly alike, I can when required use front and back dishlike stampings which vary in dimensions, to enable wheels to be constructed with a greater dish, and so that the tires and wheels may be adjusted closer up to the chassis frame in steering wheels, enabling the center line of the front steering tires of a chassis to be close up to or on the same vertical line as the axis of the steering pivots, or I may use these wheels with an extra dish for back driving wheels when the center lines of the back tires are required to be fitted very close up to the chassis frame, see Fig. 2.

The various metal stampings and fitments of the wheels may be manufactured and standardized in all suitable dimensions, shapes and materials to suit the type of chassis for which the wheels are wanted.

Claims:

1. A divisible disk wheel with four main dishlike stampings each of which is manufactured in one piece from center hole to circumference, the two outer stampings being detachable from the two inner and forming the front and back faces of the wheel and a hooking clamping device at the wheel's outer circumference, the two inner stampings being rigidly attached together back to back and forming a circumferential distance piece and a rim which lies keyed and locked by and between the extreme hooking flanges of the two detachable face stampings, substantially as described.

2. A detachable disk wheel with four main dishlike stampings each of which is manufactured in one piece from center hole to circumference, the two outer stampings being detachable from the two inner and forming the front and back faces of the wheel and a hooking clamping device at the wheel's outer circumference, the two inner stampings being rigidly attached together back to back and forming a circumferential distance piece and a rim which lies keyed and locked by and between the extreme hooking flanges of the two detachable face stampings, each stamping having suitable holes to facilitate the detachment of the two face stampings from the circumferential distance piece and additional strengthening and central distance pieces suitably fitted in position, substantially as described.

In testimony whereof I affix my signature in presence of two witnesses.

EDWARD BRICE KILLEN

Witnesses:
 JOHN LIDDLE,
 JOHN TRAIN LIDDLE.